April 15, 1930.  I. COVINO  1,754,817
AIRCRAFT
Filed Oct. 2, 1929
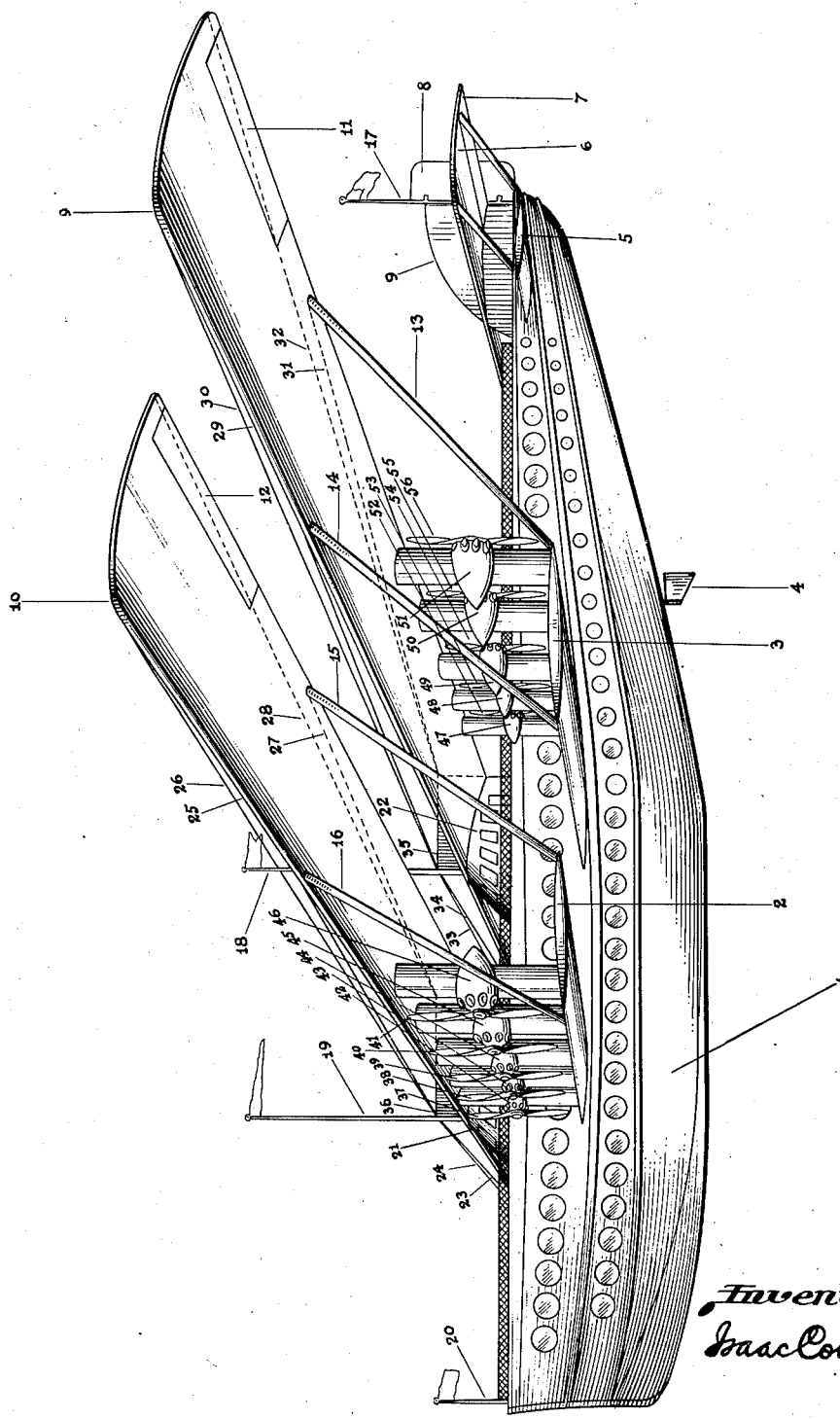
Inventor:
Isaac Covino Patented Apr. 15, 1930

1,754,817

UNITED STATES PATENT OFFICE

ISAAC COVINO, OF WEST NEW YORK, NEW JERSEY

AIRCRAFT

Application filed October 2, 1929. Serial No. 396,854.

The objects I have in view are the following:

To produce an aircraft of the tandem type.

To produce an aircraft of the tractor and pusher type with a multiple system of propulsion and each propeller with an independent motive power.

To produce an aircraft capable of ascending from or descending on water.

To produce an aircraft whose main body is equipped with all modern passenger carrying conveniences.

To produce an aircraft of large displacement capable of making long distance flights.

Finally to produce an aircraft capable of carrying a great number of passengers so as to make its operation a financial paying proposition.

These and further objects will appear more clearly from the following specification and accompanying drawing.

The drawing is a perspective view of a complete aircraft.

General construction and design

In general design my aircraft consists of a main body similar to a boat with usual control cabin on its upper deck, passenger accommodations, radio room, eating room, kitchen, wash room, fuel storage compartment, baggage room etc., port windows, water rudder for steering in water and all other facilities used on crafts navigating on water; two planes arranged in tandem are located on the upper deck of said boat while underneath each plane and sustained by a smaller plane, motors with their respective propellers are located; on top of the after deck of said boat the horizontal and vertical rudders are located for the purpose of steering the aircraft while in motion in the air. The aircraft shown in the drawing has twenty propellers with their respective motors, but the number of propellers and their respective motors can be diminished or increased in proportion to the size of aircraft. Each plane has the usual stabilizers and each plane is held fast by struts underneath and cables on top.

The sustaining planes 2 and 10, 3 and 9 are placed in tandem, the main planes 9 and 10 being above the top deck of the boat 1, and the smaller planes 2 and 3 about midway the side of the boat 1, with sufficient space between the upper plane and lower plane to allow propellers 37, 38, 39, 40 and 41; 52, 53, 54, 55 and 56 moved respectively by motors 42, 43, 44, 45 and 46; 47, 48, 49, 50 and 51 to rotate freely. Each plane is made of the usual construction having the usual curvature on the upper surface and the usual stabilizers at their respective tips. The propellers 37, 38, 39, 40 and 41; 52, 53, 54, 55 and 56, together with those on other side of aircraft not shown in drawing are made of the usual construction; similarly the motors 42, 43, 44, 45 and 46; 47, 48, 49, 50 and 51 and those on other side of aircraft are made of the usual construction; similarly 13, 14, 15 and 16; stabilizers 11, and 12; horizontal rudder 6—7 with its supporting fin 5; vertical rudder 8—9 are all made of the usual construction.

Plane 9 is held fast by supporting cables 29, 30, 31, 32, 33 and 34 which are supported by vertical fin 35 located on top of cabin 22; similarly plane 10 is held fast by supporting cables 23, 24, 25, 26, 27 and 28 which are supported by vertical fin 36 located on top of cabin 21. Boat 1 has the usual rudder 4 for the purpose of steering it while navigating in water, and also mast-heads 17, 18, 19 and 20 for the purpose of enabling the aircraft to keep its equilibrium while navigating in water and also in the air; said boat 1 having on its side port holes or windows for the purpose of allowing light and air ventilation to the inside of boat.

To operate

The propellers 37, 38, 39, 40 and 41; 52, 53, 54, 55 and 56 are set in motion by their respective motors 42, 43, 44, 45 and 46; 47, 48, 49, 50 and 51 either simultaneously or in pairs of any combination, at the will of the operator, always in a manner that equilibrium is maintained at all times, when sufficient speed is acquired and by turning horizontal rudder 7 up, the aircraft will arise from the water and proper maneuvering of horizontal rudder 7 and stabilizers 11 and 12 a stable equilibrium may be maintained; also by moving vertical rudder 8 to the right or left horizontal direction may be had. Speed may be diminished by stopping some of the motors or by lowering the revolutions of the motors; similarly speed may be increased by increasing the revolution of the motors, keeping all motors and their respective propellers going. To descend to surface of water the operator stops motors and by lowering horizontal rudder 7 he will cause the aircraft to descend on surface of water, as the aircraft touches the surface of the water the resistance offered by the latter will gradually stop the aircraft. By setting in motion part or all of propellers and by steering of water rudder 4 the aircraft may navigate on water. All steering is made by operator located in front cabin 21 where the control room is located, all steering being accomplished by the usual manner employed in aircraft.

Having now described my invention, what I claim as new and desire to secure by Letters Patent is:

An aircraft having a combination of a main body similar to a boat, tandem planes and horizontal rudder, tractor and pusher propulsion, whose motive power and its respective propulsion is located underneath main supporting tandem planes and supported by shorter planes located midway body of boat and underneath main supporting planes, all substantially as described.

In testimony whereof I have affixed my signature.

ISAAC COVINO.